June 8, 1937. LE ROY C. MORRIS 2,082,968
TORSION BALANCE SCALE
Filed June 3, 1936 2 Sheets-Sheet 1

Inventor
LeRoy C. Morris.
by G. C. Kennedy
Attorney

June 8, 1937.   LE ROY C. MORRIS   2,082,968
TORSION BALANCE SCALE
Filed June 3, 1936   2 Sheets-Sheet 2
Fig. 3.
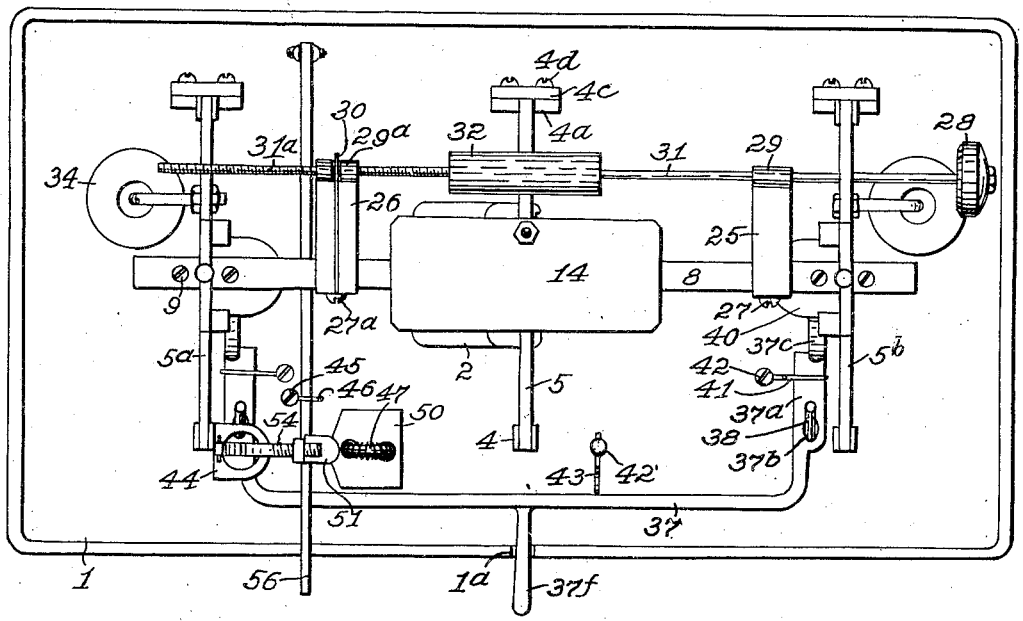
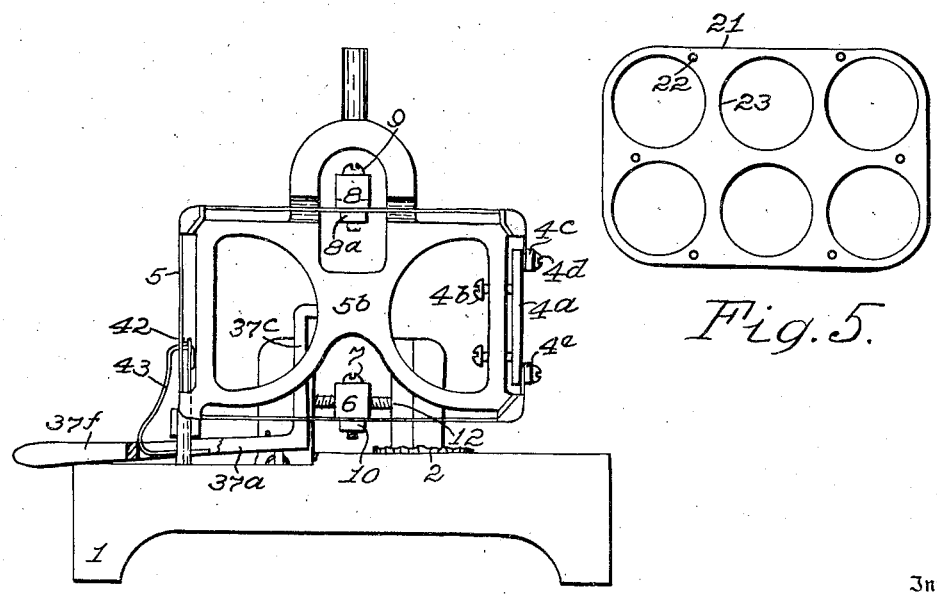
Fig. 4.
Fig. 5.
Inventor
LeRoy C. Morris,
G.C. Kennedy
Attorney Patented June 8, 1937

2,082,968

UNITED STATES PATENT OFFICE 2,082,968

TORSION BALANCE SCALE

Le Roy C. Morris, Cedar Falls, Iowa

Application June 3, 1936, Serial No. 83,225

5 Claims. (Cl. 265—54)

My invention relates to improvements in balance scales, and particularly to torsion scales, and an object of my improvements is to provide an apparatus constructed suitably for convenient use in creameries and the like.

A special object of my improvements is to supply equalized means for reducing vibrations in the moving elements for the better reading of a pointer over a graduated scale.

Another object of my improvements is to furnish a plurality of like resilient torsional bands upon which the medially tiltable beam structures are mounted medially and at the end parts of the beams, and which bands are adapted to resist displacements laterally of the beam structures while in movement and to render their movements steady and accurate in the functioning of the scale.

Another object of my improvements is to provide an auxiliary weight device movably and removably mounted upon one extremity of the beam structures, with means for manually shifting the weight device at will into or out of co-action with said structures, when it is desired to employ the weight in the operation of balancing and filling to capacity and in equality containers supported upon the scale pans.

Another object of my improvements is to furnish the apparatus with manually and resiliently controllable locking means for the tiltable beam structures, releasable therefrom, and which in use rigidly lock these structures in a state of equilibrium and steadiness when desired.

I have accomplished these objects in successful reduction to practice, by the means and mechanisms illustrated in the appended drawings.

It is to be understood that various modifications in the details of construction and arrangement of parts of the apparatus and its connections may be made without departure from the principles and scope of the invention as described herein and defined by the following claims.

Figure 1:
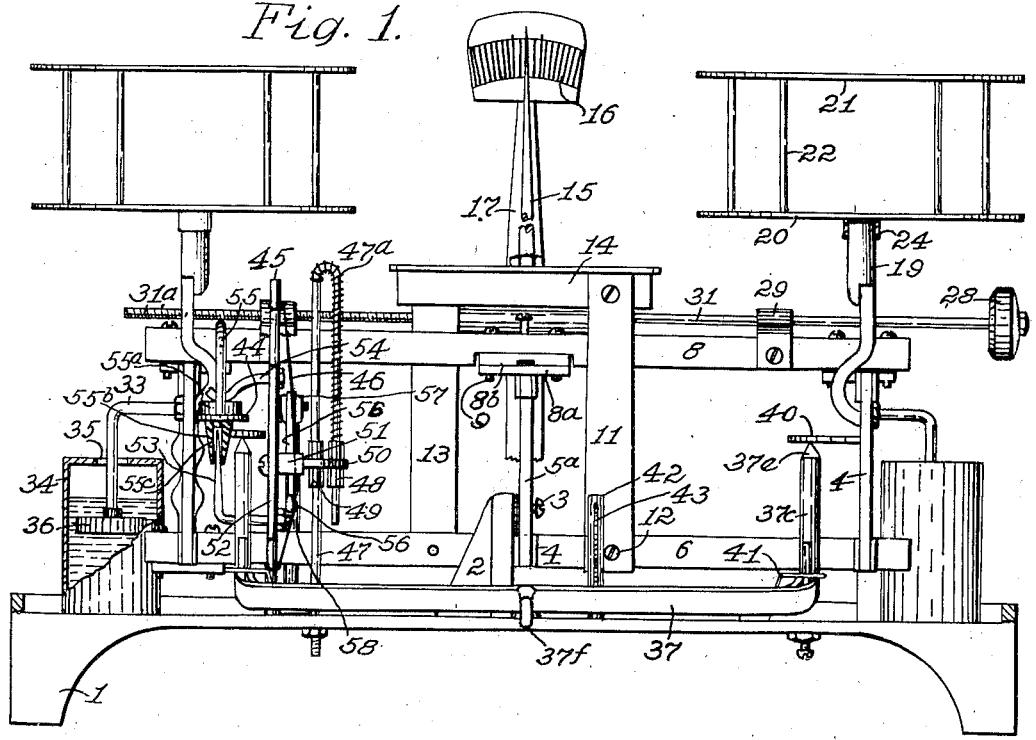
Figure 2:
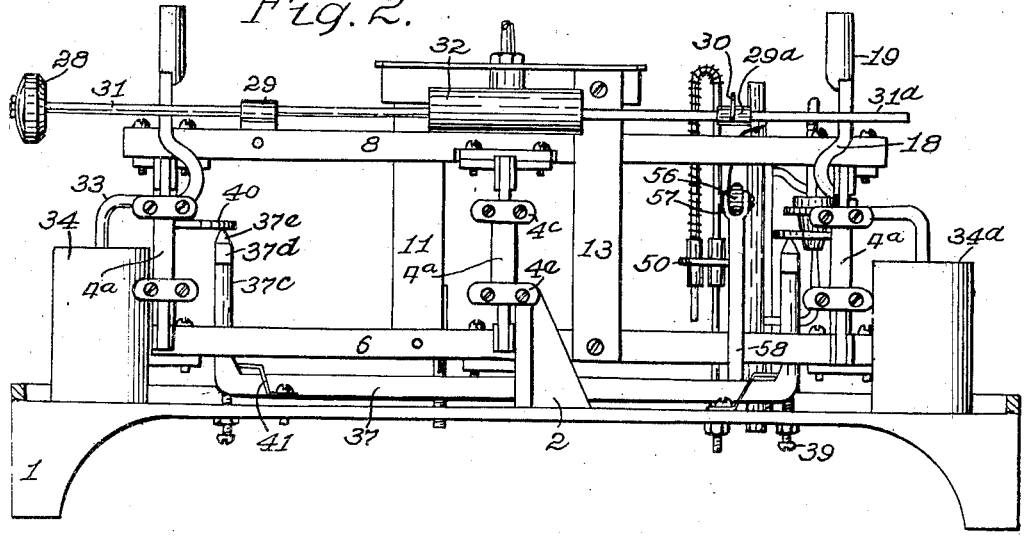

Fig. 1 is a front elevation of my scale apparatus, uncased, and with portions broken away or in section. Fig. 2 is a rear elevation thereof with the platform pans removed. Fig. 3 is a top plan of the device, also with the pans removed. Fig. 4 is an end elevation, and Fig. 5 is a top plan of one of the platform pans of the device.

In creameries and the like an apparatus is required which is constructed for ready and quick use in the equalizing, and the weighing of the contents of bottles or other containers, whether one or a plurality of them as desired. The auxiliary mechanisms provided in this invention are adapted for any of such uses, and weight means applicable to one extremity of the beam structures are included for employment at necessary times.

Referring first to said Fig. 1, the numeral 1 denotes a base body upon which said mechanisms are mounted either fixedly or movably, as hereinafter described. Upon this base is fixed a pair of like supports 2 to which are rigidly fastened by screws 3 spaced parts of a medial transverse bridge member 5b of a generally rectangular shape with rounded corner parts projecting and about which are closely fitted a resilient torsional band 5, and, as shown in Fig. 4 and Fig. 2 the ends of this band are fastened to the member 5b by screws 4d secured to a clamping bar as at 4c and 4e to another bar 4a whose ends in turn are fastened by screws 4b to the member 5b.

These fastenings hold the band 5 in tension around the member 5b. A longitudinally spaced pair of like bridge members 5a and 5b are equally spaced from the medial member 5 but are not mounted rigidly on the base 1. Like torsion bands 4 are secured by like fastening means around them. The members 5a and 5b, however, have at the top upwardly arcuate parts which terminate upwardly in cylindrical stems 19.

As shown in Figs. 1 and 5, a platform pan 20 has a hollow socketed part 24 which in each of a pair of these devices are thus removably mounted upon the stems 19, and only upon the end members 5a and 5b. For convenience, upon each platform 20 are fixed standards 22 therearound and upon which are fixed in each case the top plate 21 having holes 23 to fit milk or cream bottles.

The numerals 8 and 6 respectively denote like vertically spaced beams in parallel like positions above the base member 1. As indicated in Fig. 4, the like ends of these beams are secured at top and bottom respectively to medial parts of the torsional bands, as 5 and 4, by clamps 8a and 10 and screws 9 and 7, respectively. As shown in Fig. 1, the middle parts of these beams are similarly secured to the middles of the middle band 5a at top and bottom of the bridging member 4, by means of clamps 8a and 8b and screws 9. It will be seen, that the beams 8 and 6 are torsionally supported medially, permitting the beams to be rocked upon the middle upper part of the torsional band 5a, but as the latter is thus placed under torsional strain, the beams when released are quickly restored to horizontal equilibrium. A platform 14 is positioned medially above the upper beam 8, and carries rigidly medially along one longitudinal side an erect pointer 15, whose termination may oscillate across a scale 16 on a plate secured upon a standard 17, which is fastened upon the top of a casing not shown for the apparatus. The platform 14 is rigidly supported on vertically disposed standards 11 and 13 respectively fixed upon the beams 6 and 8.

The numerals 34 and 34a indicate like dash-pots mounted upon the end parts of the base member 1 fixedly, and have central apertures in their top walls at 35 (see Fig. 1), traversed by downwardly bent stems 33 fixed rigidly upon the end bridging members 4 (Fig. 1). On the lower ends of the stems 33 are fixed pistons 36, normally immersed in a suitable liquid in these dash-pots. As each end of the beam structure has like pistons 36, it is obvious that when the beams are rocked more or less suddenly in use the pistons 36 are frictionally retarded by the liquid coating them, to thus minimize violent rocking of the beam structure, and equally at both terminations thereof. The relatively wide clearance space in each dash-pot around each piston 36 allows slight swinging of the piston 36 therein.

It is desirable at times to lock the beam structures 8 and 6 rigidly in a horizontal position, as when bottles are being mounted removably in the platform pans 20, or when being removed therefrom. I have provided a simple means for this locking. On the inner face of each swinging bridging members 5a and 5b is a fixed bracket 40 disposed horizontally. A longitudinal bar 37 having a medial handle 37f and end furcations 37a, have fixed terminal stems 37c with conical tops 37e impinging upon the lower faces of the brackets 40 when the forked bar 37 is in its lowered position, thus locking both terminations of the beam structure rigidly. When it is desired to unlock the beam structure for use in the weight comparisons of bottles and their contents upon the platform pans 20 and 21, the handle 37f is rocked upwardly with the bar 37. In Fig. 2 are shown fulcrum pins 39 adjustably mounted in opposite end parts of the base member 1, and upon whose upper ends the inturned end parts of the furcations 37a may rock up or down. Guide posts 38 fixed in the base member 1 loosely traverse elliptic bearing openings 37b in the furcations 37a, to prevent loose play thereof. The offset spring fingers 41 (see Fig. 3) fixed on the base member 1 engage the tops of the furcations 37a and tend to retain the latter in their downwardly swung releasing positions when the bar 37 is lifted to release the beam structure for free swinging oscillations. A fixed standard 42 on the base member 1 adjacent the inner face of said bar 37 has a split and looped spring clip 43 secured thereto at the top fixedly but loosely connected thereto at the lower end of the standard, the clip as shown in Fig. 4 having a medial depressed bend ending below in a convex bend, and this clip therefore yields to engage the inner face of the bar 37 when down to releasably secure it in that position with the standard parts 37c supporting the brackets 40 horizontally and fixedly to lock the beam structure. When the bar 37 is swung upwardly the concavity of the clip 43 locks the standards 37c in lowered positions.

I have shown in Fig. 3 means for adjusting and limiting the play of the beam structure from the horizontal. In a like pair of bracket arms 25 and 26 fixed on the upper beam 8 and in hollow terminal sleeves 29 and 29a thereon is slidably seated the threaded end portion 31a of a shaft 31 having an end knob 28. A cylindrical weight 32 is also slidably mounted upon said shaft to be adjusted to and fro therealong in acting to place the shaft in swinging equilibrium of the beam structures. The bracket sleeve 29a on the bracket 26 is troughed across transversely medially to expose a threaded part of the shaft 31 therein. A spring finger 30 having its inner end secured to the beam 8 by a screw 27a, has its free termination seated in the said sleeve trough, the finger being adapted to fit in the thread of said shaft to lock releasably the shaft 31 and its weight 32 in an adjusted position of the weight. As the thread on the shaft 31 is narrowly troughed between its circlings, the shaft may be moved endwise through the sleeve 29a at will, the finger 30 lifting and riding over the thread to reengage the thread when the shaft is adjusted.

Referring now to Figs. 1, 2 and 3, I have shown a device operable at times in loading one end of the beam structure by a weight of a determined amount during the moment when the scale at 15 and 16 shows the beam structure tilted by different loadings on the platform pans 20 and 21. This may be a gram weight, for instance a weight of nine grams shown at 55a in Fig. 1, having a top loop 55 for suspension of the weight when lifted upon an upwardly dished arm 54 fixed on a bar 52, the latter being supported upon a block 51 having a flat horizontal bracket 50 with hollow sleeve bearing 49 thereon slidable to and fro or up and down upon a fixed standard 47 on the base 1. The bracket 50 has another hollow sleeve 48 thereon slidable up and down with the bracket upon a downwardly inverted portion of the standard 47. A coiled spring 47a is mounted on said inverted portion and secured at its upper end to the standard bend and stopped at its lower end by the sleeve 48.

Referring to said Fig. 3, also Fig. 2, a fixed standard 58 has top furcations 57 between which is pivoted the rear end of an arm 56 which projects forwardly under and in contact with the block 51. Another fixed standard 45 on the base 1 has a resilient wire 46 loosely connected at its upper and lower ends to the standard 45, the arm 56 being in the slack of this wire to press against it, but when the arm is in any of its swinging positions the wire always engages and brakes it to retain it in its adjusted up or down position.

The gram weight 55a of discoidal shape has a depending conical frustum 55b downwardly hollowed at 55c to receive therein the upwardly bent sharply pointed end part 53 of an arm projecting from said bar 52. The weight 55a, when the beam structure is locked fixedly by the lowering and locking of the handled bar 37, is supported upon the apertured bracket 44 projecting from the adjacent bridging member, and lowered therewith, when the bar 37 is raised, and in both cases when the arm 56 is lowered. When the arm 56 is raised however, it lifts the vertical bar 52, the point of the arm 53 rising with it and lifting the weight part 55c and to separate the weight part 55a upwardly from the bracket 44, and in this instance the beam structure is in free swingable equilibrium when the pan or pans 20 are loaded, equally, or both unloaded.

*Operation*

The operator first locks the beam structure by lowering the forked bar 37, after he has if necessary used the weight device 32 with sliding of the shaft 31 through the bearing sleeve 29a. In case the liquid containers or bottles, one or more on the pans 20, when those on both pans are compared by reference to the position of the pointer 15 over the scale 16, show differences of content, when the arm 52 is lifted to free the beam structure, the arm 56 may be lowered which lowers the weight 55a upon the bracket 44, and, the bar 37 being in raised position, the freely tiltable beam structure then is depressed at that end, and the operator may then supply to a deficiently filled container more liquid until the beam structure shifts to indicate by the pointer 15 on the scale the medial mark thereon.

It is obvious, that by the above means, by the addition of one container of liquid after another on either of the pans 20 alternately, the containers may be filled by the use of the gram weight in each case to bring the loads on the pans to a measured equality exactly in contents.

The operator, therefore, may proceed with his work continuously in comparing the respective amounts or filling of the respective containers, in removing in sequence the completely filled containers and then trying out another succession of the more or less completely filled containers, to enable him to then properly bring the contents of all the containers on the apparatus to an equality, and to effect this without loss of time.

I claim:

1. In a scale apparatus having medially pivoted beam-structures, like brackets fixed on opposite end parts of the beam-structures, and a single rockable device supported adjacent and alongside the beam structures, having arms with offset standards beneath and releasably engageable simultaneously terminally with said brackets respectively to hold the beam-structures releasably in locked horizontal position, resilient means engaging arms of said locking devices for releasably holding the standards in an unlocked position relative to the beam-structures, and other resilient means also engageable with said locking device between said arms for releasably holding them in locking engagement with the beam-structures.

2. In a scale apparatus having medially pivoted beam-structures, brackets fixed on opposite end parts of the beam-structures, and movable connected means, simultaneously operable, for locking or unlocking the beam-structures, and comprising a bar positioned swingably at one side of the beam-structures and having end furcations, the furcations having end standards rigid therewith to terminally engage said brackets simultaneously when the bar is swung in one direction to lock the beam-structures in a horizontally disposed position releasably, and independent means for resiliently releasably holding said bar and standards locked with the brackets, or for resiliently releasably holding the bar in a position where said standards are shifted out of engagement with said brackets.

3. In a scale apparatus having medially pivoted beam-structures, brackets fixed on opposite end parts of the beam-structures, and movable connected means, simultaneously operable, for locking or unlocking the beam-structures, and comprising a bar positioned swingably at one side of the beam-structures and having end furcations, the furcations having end standards with offset terminal detents to engage said brackets at times, and independent resilient means engaging said bar and its furcations respectively, to lock the furcations when disengaged from the brackets, or to releasably lock the bar when swung down to hold the end standards with their end detents engaged with and locking said brackets and the beam-structures rigidly.

4. In a scale apparatus having medially pivoted beam-structures, brackets fixed on opposite end parts of the beam-structures, and movable connected means, simultaneously operable, for locking or unlocking the beam-structures, and comprising a handled bar positioned swingably at one side of the beam-structures and having end furcations with raised and terminally offset standards to simultaneously engage and lock with the brackets to hold the beam-structures rigid in a certain position, means for controlling and releasably locking said bar and standards respectively in locked or unlocked positions relative to said brackets, adjustable fulcrum members on which said furcations are swingably mounted, said furcations having elongated bearing apertures, and fixed posts traversing said apertures for maintaining the bar while being swung against endwise movements.

5. In a scale apparatus having medially pivoted beam-structures, a weight having a top loop and having a recess in its lower end, a rigid seating ring on one end of the beam-structures to at times seat said weight to unbalance them, and means releasably engageable with said weight and operable to unseat it to permit unrestricted movements of the beam-structures and at other times to be reversed in movement to seat the weight, said means comprising a pivoted arm, a resiliently controlled structure mounted movably on said arm, said structure having an upwardly concaved stem passed through the weight loop, and having another stem beneath said seating ring with a terminal seated in the bottom recess of the weight loosely, whereby when said arm is lifted the weight is lifted by means of the upper stem on said structure to allow the beam-structure to freely oscillate, and when the arm is lowered both stems are disassociated from the upper and lower parts of the weight respectively to allow the weight to seat upon the seating ring to unbalance the beam-structure.

LE ROY C. MORRIS.